3,138,644
POLYMERIZATION INHIBITOR
Terrence Huff and Eli Perry, Texas City, Tex., assignors to Monsanto Company, a corporation of Delaware
No Drawing. Filed Jan. 2, 1962, Ser. No. 163,905
4 Claims. (Cl. 260—666.5)

The present invention relates to the stabilization of vinyl aromatic hydrocarbons against polymerization and, more particularly, to such stabilization at elevated temperatures.

It is well known that vinyl aromatic compounds such as styrene, its homologs and analogs, tend to polymerize upon standing at ordinary temperatures and particularly when subjected to elevated temperatures. Concentration and purification of these monomers is ordinarily effected by distillation or fractionation and in these operations considerable difficulty has been experienced due to polymer formation. The polymer is deposited upon the surfaces of the equipment and accumulates to the extent that the distillation must be interrupted at frequent intervals to clean out the equipment. In addition to the fact that this results in substantial losses of the monomer, the delays in production caused by the necessity of removing the polymer formed may also be an important cost factor. Also, since the monomers are subject to autopolymerization, there is some risk in storing and/or shipping them due to the exothermic nature of the polymerization reaction. Further, in the manufacture of polymers from these monomers, premature polymerization even to a very slight degree may render the monomer unfit for use since it may seriously affect the properties of the final polymeric product. For these and other reasons, it is essential to prevent premature polymerization and in common practice this is done by adding an inhibiting agent to the monomer.

It is an object of the present invention to provide a novel polymerization inhibitor for vinyl aromatic compounds.

A further object of the invention is to provide a polymerization inhibitor for vinyl aromatic hydrocarbons which is effective at elevated temperatures such as those that are encountered in concentration and purification of said compounds by distillation and/or fractionation.

Another object of the invention is to provide inhibited monomeric vinyl aromatic compounds.

Other objects and advantages will become apparent from the following description of the invention.

According to the invention, the polymerization of vinyl aromatic hydrocarbons is effectively retarded or inhibited by the incorporation therein of a minor amount of diphenyldichlorosilane. The following example illustrates the invention but is not to be construed as limiting it in any manner whatsoever.

*Example 1*

Samples of freshly distilled styrene monomer containing small amounts of diphenyldichlorosilane and of styrene containing no inhibitor were subjected to polymerization in sealed ignition tubes according to the following procedure. The samples of styrene (about 20 ml.) and styrene containing diphenyldichlorosilane were charged to drawn-out 25 x 200 mm. test tubes under an atmosphere of argon. The contents of the tubes were frozen in Dry Ice and the tubes were sealed off under vacuum. The tubes were allowed to warm up until the contents had thawed, then they were placed in an oil bath maintained at 100±0.3° C. After a period of about 2 hours, the tubes were removed from the bath and quickly cooled to room temperature. They were then broken open and the contents of each tube were poured into ten times their volume of methanol to precipitate any polymer present. The resulting suspensions were filtered to recover the polystyrene products which were air-dried and then oven-dried at ~60° C. under vacuum to constant weight. The rate of conversion to polymer was calculated for each sample polymerized. Data obtained which are presented below demonstrate that the styrene containing diphenyldichlorosilane polymerizes at least five times slower than does the uninhibited styrene.

| Sample No. | $(C_6H_5)_2SiCl_2$ Inhibitor, Wt. percent | Rate of Conversion to Polymer, percent/hr. |
|---|---|---|
| 1 | None | 2.2 |
| 2 | 0.52 | 0.43 |
| 3 | 0.67 | 0.28 |

The amount of the inhibitor to be used will, of course, vary according to the particular conditions under which it is used. For storage at low temperatures, as little as five parts by weight of diphenyldichlorosilane per million parts by weight of monomer may be effective. At the higher temperatures at which this inhibitor is highly effective, such as for example, 100° C., larger amounts are required. Generally, proportions of diphenyldichlorosilane within the range from about 0.001% to about 5% are satisfactory.

The inhibitor of the invention is effective with compounds containing ethylenic unsaturation in a side chain. It is particularly effective with such vinyl aromatic compounds as styrene, α-methylstyrene, ring-methylated styrenes and ring-chlorinated styrenes, divinylbenzene, ethylvinylbenzene, vinylnaphthalene, and the like.

Monomers containing very low concentrations of the inhibitor, in the range of 5 p.p.m. for example, can be polymerized by adding an excess of the catalyst. When larger quantities of the silane are used, it is desirable to remove the inhibitor prior to polymerization.

What is claimed is:

1. A composition comprising a monomeric vinyl aromatic compound containing an amount of diphenyldichlorosilane sufficient to inhibit polymerization of said vinyl aromatic compound.

2. A composition comprising a monomeric vinyl aromatic compound containing from about 0.001% to about 5% by weight of diphenyldichlorosilane.

3. A composition comprising styrene containing an amount of diphenyldichlorosilane sufficient to inhibit polymerization of said styrene.

4. A composition comprising styrene containing from about 0.001% to about 5% by weight of diphenyldichlorosilane.

No references cited.